O. B. HOWARD.

Razor Straps.

No. 5,402.

Reissued May 13, 1873.

Witnesses:

J. E. Coffin

Geo. A. Locke

Inventor:

Oliver B. Howard.

by Scribner and Jordan.
attys.

AM. PHOTO-LITHOGRAPHIC CO. N.Y. (OSBORNE'S PROCESS.)

UNITED STATES PATENT OFFICE.

OLIVER B. HOWARD, OF DEERING, ASSIGNOR OF ONE-HALF INTEREST TO OLIVER P. SHEPHERD, OF PORTLAND, MAINE.

IMPROVEMENT IN RAZOR-STROPS.

Specification forming part of Letters Patent No. 117,421, dated July 25, 1871; reissue No. 5,402, dated May 13, 1873; application filed April 3, 1873.

*To all whom it may concern:*

Be known that I, OLIVER B. HOWARD, of Deering, in the county of Cumberland and State of Maine, have invented a new and useful Razor-Strop; and I hereby declare the following to be a full, clear, and exact description of the same, reference being had to the accompanying drawing, which is hereby made a part of this specification, in which—

Figure 1:
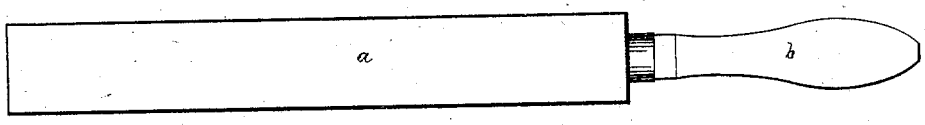
Figure 2:
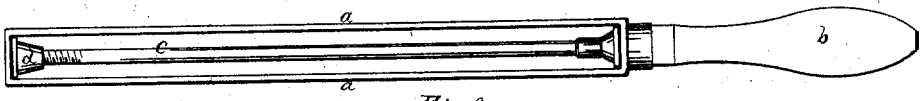
Figure 3:
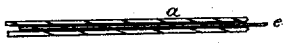

Figure 1 is a side view of my invention. Fig. 2 is an edge view of same; and Fig. 3 is a view, in section, of the leather covering with its non-extensible metallic base.

Same letters show like parts.

The object of my invention is to produce an improved means for giving an edge to a razor or other similar tools, on which a fine keen edge is desired. For this purpose leather has long been used, and in some cases has been sprinkled or covered with emery-flour, or crocus, or other similar materials, to aid in sharpening the razor. Great difficulty has been experienced in rendering the leather elastic under the pressure of the tool, and to retain at the same time its non-extensibility in the direction of its length, or, in other words, preventing it from stretching out.

It is well known that it is very desirable that a strop should be elastic under the pressure of the tool when it is sharpened, as by this means a better edge is obtained, and in much less time than when the strop is rigid, as against the pressure of the edge of the razor or other tool, but if the leather strap is left unsupported against the traction in the direction of its length (which is necessary to render it elastic, as above described) it very soon stretches out and becomes worthless.

My invention is designed to secure these two qualities of elasticity laterally, and longitudinal rigidity or non-extensibility; and consists in cementing or fastening in any similar way upon the under side of the leather of which the strop is to be made a thin strip of zinc, which is non-extensible in the direction of its length. Being made thin, the metal gives way or yields with the leather to which it is attached when pressed upon, but resists firmly any longitudinal strain which may be put upon the leather to which it is attached. Having thus re-enforced the leather from stretching, I make it in the form shown at *a*, Fig. 1, and *a a*, Fig. 2—that is, a long narrow strip, which, after being doubled upon itself as shown in *a a* Fig. 2, is provided with the handle *b*. To this handle *b* is attached the rod *c*, having upon its outer end—*i. e.*, furthest from the handle *b*—the screw *d*, which works into the end, or, rather, is attached to the end piece over which the band *a* is doubled. The band *a* is rigidly attached to the handle *b*, and thus, as will be seen, the band *a* may be loosened or tightened at the will of the operator.

I am aware that strops have been made of leather bands passing over blades of steel, but not cemented or in any manner attached to them, and I do not claim such a device as this.

Differing degrees of fineness upon the strop may be produced by using emery-flour or crocus upon it, or the leather alone may be used with a very useful effect. In Fig. 3 is shown the band *a* with its underlying metallic base *e*, as described, in section.

What I claim as my invention, and desire to secure by Letters Patent, is—

1. A band of leather provided with a thin elastic, but non-extensible, base of metal cemented thereto, to be used in a razor-strop, in the manner substantially as shown.

2. The combination of the band *a*, constructed as described—that is, having a non-extensible base cemented thereto, with the handle *b*, rod *c*, and end piece *d*, in the manner and for the purposes substantially as shown.

OLIVER B. HOWARD.

Witnesses:

D. W. SCRIBNER,

F. E. JORDAN.